United States Patent [19]

Belisomi

[11] 4,224,639

[45] Sep. 23, 1980

[54] DIGITAL SYNCHRONIZING CIRCUIT

[75] Inventor: Pietro Belisomi, Pinerolo, Italy

[73] Assignee: Indesit Industria Elettrodomestici Italiana S.p.A., Italy

[21] Appl. No.: 883,237

[22] Filed: Mar. 3, 1978

[30] Foreign Application Priority Data

Mar. 3, 1977 [IT] Italy .............................. 67463 A/77

[51] Int. Cl.² ............................................. H04N 5/04
[52] U.S. Cl. ................................................. 358/158
[58] Field of Search ............... 358/148, 155, 158, 149; 331/20

[56] References Cited

U.S. PATENT DOCUMENTS

| | | | |
|---|---|---|---|
| 3,688,037 | 8/1972 | Ipri | 358/158 |
| 3,708,621 | 1/1973 | Yamamoto | 358/158 |
| 3,855,496 | 12/1974 | Ciciora | 358/158 |
| 3,904,823 | 9/1975 | Van Straaten | 358/148 |
| 3,906,155 | 9/1975 | Van Straaten | 358/158 |
| 3,935,388 | 1/1976 | Brinkmann | 331/20 |
| 4,096,528 | 6/1978 | Tuma et al. | 358/158 |

*Primary Examiner*—Robert L. Griffin
*Assistant Examiner*—Joseph A. Orsino, Jr.
*Attorney, Agent, or Firm*—Lerner, David, Littenberg & Samuel

[57] ABSTRACT

The invention relates to a circuit arrangement for vertical synchronization of a television receiver. Vertical synchronization pulses are generated by dividing pulses derived from a line frequency signal and these signals are compared with the received synchronization pulses. The circuit is designed to ignore spurious received sync pulses and to compensate for omitted sync pulses but automatically resets the divider for rephasing the generated sync signals when found to be out of phase with the received signals.

11 Claims, 3 Drawing Figures

DIGITAL SYNCHRONIZING CIRCUIT

The present invention relates to a circuit arrangement for vertical synchronization of a television receiver.

The normal practice is for the vertical deflection circuit to consist of an astable multivibrator circuit, synchronized by the vertical sync pulse separated in the known way from the received video signal. The only means of noise protection on this circuit is the sync separator and the pull-in range of the multivibrator; the smaller the range is, the more protection there is against noise since the sync signal has less time to synchronize the multivibrator. In practice, the pull-in range can never be very small as it must allow recovery of the multivibrator circuit tolerances and drifts so that noise immunity is never really satisfactory. This leads to vertical trembling of the picture and even loss of the picture altogether in the case of a low signal/noise ratio or pulse disturbances such as those caused by electric machines, etc.

As synchronization is direct, the phase is not very stable as a result of interference on the sync pulse front caused by unwanted noise signals, such as line-frequency pulses, which result in poor stability and interlacing of the picture on the screen. Vertical synchronization circuits are known (French Pat. No. 2248659) which use a digital technique to obtain a vertical deflection signal by frequency division of another signal derived from the line deflection signals, that is, which rely on the principle that, for a given television standard, the number of lines in a frame is a constant. In theory, these circuits could eliminate entirely the drawbacks of the known systems already mentioned. In practice, however, it is not enough to generate a signal with the exact field frequency of the television signal. A given phase relationship must also be established between it and sync pulses. The phase of the frequency divider must be determined by applying the sync signals as reset pulses.

The present invention seeks to provide a digital circuit arrangement for generating a vertical deflection signal which mitigates the problems encountered in known systems.

According to the present invention, there is provided a circuit arrangement for vertical synchronization of a television receiver with respect to received sync signals, the arrangement comprising a frequency divider connected to receive pulses derived from an incoming line frequency signal to generate vertical sync pulses, a circuit for detecting coincidence between the vertical sync pulses generated by the divider and received vertical sync pulses, a further circuit operative to produce no more than one pulse during each vertical deflection cycle indicative of any phase error between the generated and the received vertical sync pulses and a control circuit connected to the coincidence detecting circuit and to the said further circuit for resetting the divider to rephase the generated vertical sync pulses for synchronism with the received vertical sync pulses.

The invention will now be described further, by way of example, with reference to the accompanying drawings, in which.

Figure 1:
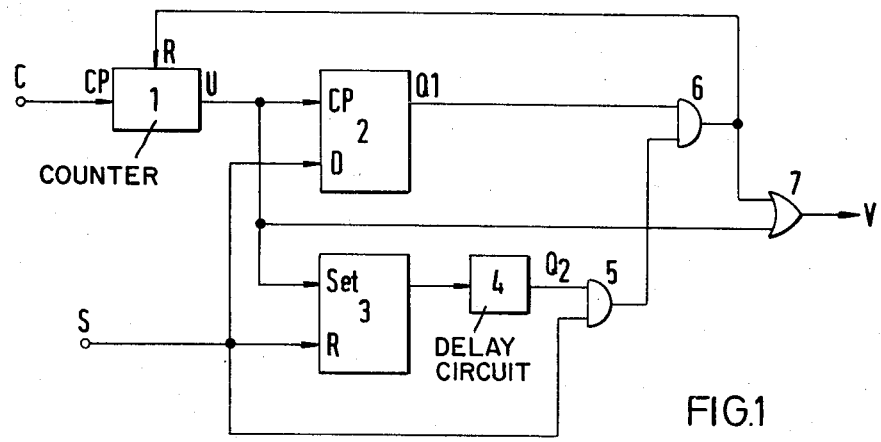
FIG. 1 shows a block circuit diagram of a vertical or frame synchronizing circuit according to the present invention which employs negative logic elements.

In FIG. 1, an input terminal C, on which a double-line-frequency signal is available, is connected to the clock input (CP) of a counter 1 which divides by 625, and the output (U) of which is connected to a first input (CP) of a D-type flip-flop 2, to a first input (Set) of an R-S flip-flop 3 and to a first input of an OR gate 7.

A second input terminal S, at which a sync signal is available, is connected to the second inputs, D and Reset respectively, of flip-flops 2 and 3 and to a first input of an AND gate 5, the second input $Q_2$ of which is connected to the output of flip-flop 3 by way of a delay circuit 4.

The output of AND gate 5 is connected to a first input of an AND gate 6 the second input of which is connected to the output of flip-flop 2 ($Q_1$) and the output of which is connected to the reset input (R) of the counter 1 and to the second input of OR gate 7, the output of which is connected to output terminal V.

Figure 3:
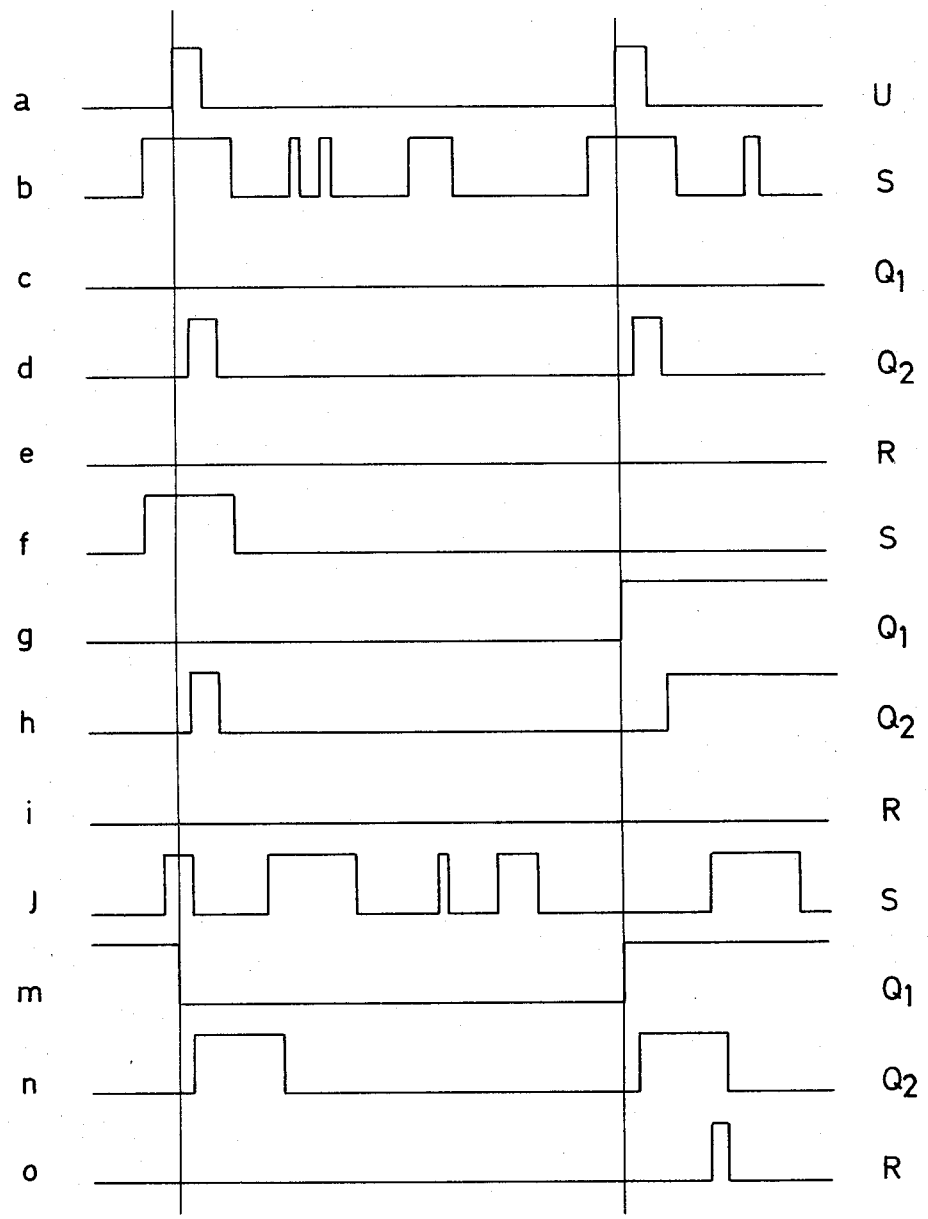
FIG. 3 shows the waveforms present at certain points in the circuits of FIGS. 1 and 2.

The circuit of FIG. 1 will now be described with reference to FIG. 3 which comprises voltage waveforms "A" to "O", the point in the circuit of FIG. 1 at which the voltage occurs being indicated in the right hand side of FIG. 3. FIG. 3 shows three possible forms of the voltage at the point S and the resultant waveforms at the points $Q_1$, $Q_2$ and R when the voltage at U is as shown in FIG. 3a.

In the case of the voltage at S being in accordance with FIG. 3b, the synchronization signals are present and in phase with the sync pulses generated on line U by the counter 1 but the synchronization signal includes additional spurious pulses. The waveform 3c which is the output of $Q_1$ of the D-type flip-flop 2 is the result of detecting the presence of sync signals on the line S at the instant that the counter 1 stops counting. If the sync pulse is present at the leading edge of the pulse in the waveform U then the voltage at $Q_1$ remains low. If, however, no sync pulse is present then the output voltage at $Q_1$ goes high.

The output $Q_2$ is the result of delaying by a time T, determined by the delay circuit 4 pulses produced by the flip-flop 3 which is set by the pulses U and reset by the pulses S.

In the case of the waveform shown in FIGS. 3a to 3e, the voltage at $Q_1$ never goes high and consequently the AND gate 6 is permanently blocked with the result that the signal U is passed by the OR gate 7 as the output at V. This is the desired operation since the incoming pulses are in phase with the sync pulses and one wishes to ignore the intervening spurious pulses.

In the case of the waveform shown in FIGS. 3f to 3i, the first sync pulse is present but the second is omitted, possibly due to a weak signal. At the second pulse U, the output of the flip-flop 2 goes high and the output of the flip-flop 3 also goes high but the AND gate 5 is blocked during the second cycle by the absence of a sync signal at the point S and the AND gate 6 remains blocked. Once again, therefore, the signal passed on to the output V consists only of the pulses U. The circuit therefore automatically compensates for a missing sync signal.

In the case of the waveforms 31 to 30, the wide sync pulses are present but are out of phase with the pulses U and it is therefore necessary to resynchronize the counter 1. In addition, there are spurious signals on the line S which should be ignored.

At the leading edge of the pulse U, a spurious signal is present on the line S and consequently the flip-flop 2 changes to a low level. It is, however, unlikely that a spurious signal should always coincide with the pulses U and a case where there is no pulse present in shown in the second illustrated cycle. On this occasion, the output of the flip-flop 2 goes high. Furthermore, the flip-flop 3 is set by the pulse U and is not reset until some time later when the sync pulse is received and consequently a delayed signal, the width of which corresponds to the phase error, is produced at the point $Q_2$. When this signal is compared with the incoming signal S in the AND gate 5, a pulse of width T is generated at the output of the gate 5 which is also passed by the gate 6 to the OR gate 7. The pulse R acts as a new synchronization signal and additional resets the counter 1 so as to bring the counter 1 back into phase with the received synchronization signals.

Figure 2:
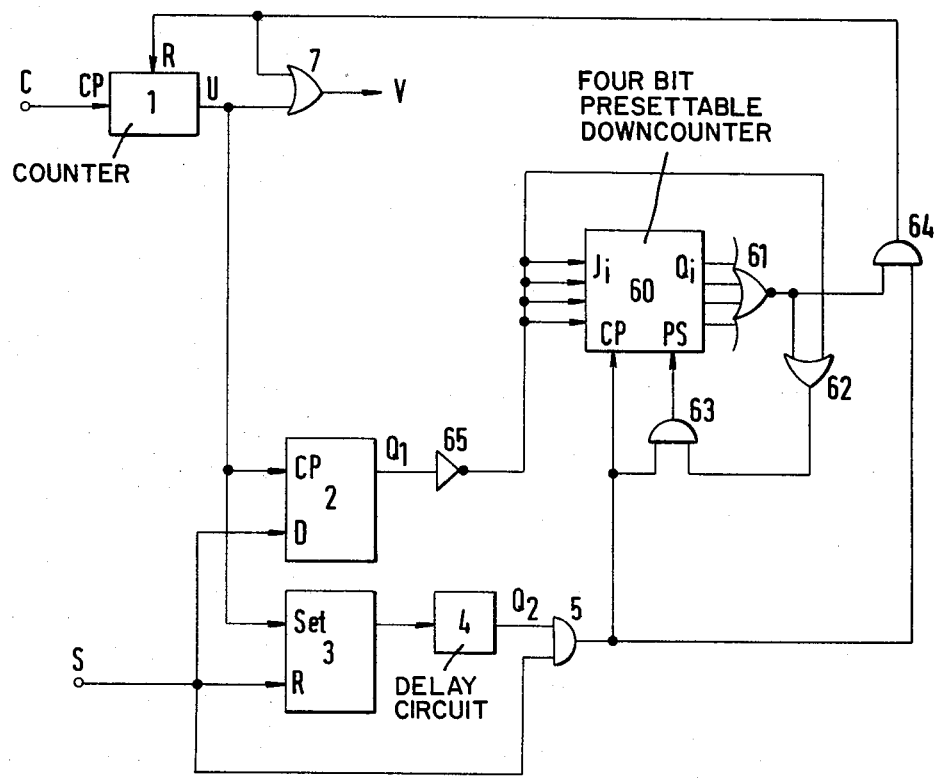
FIG. 2 shows a variant of the circuit in FIG. 1.

The circuit shown in FIG. 2 is generally similar to that of FIG. 1 and integers serving the functions already described have been allocated the same reference numerals and will not be described further. In FIG. 2, the reference numeral 60 designates a four bit presettable down counter, the inputs $J_i$ of which are connected in parallel to the output $Q_1$ of the flip-flop 2 by way of an inverter 65 and to a first input of an OR gate 62. The clock input (CP) of the counter 60 is connected to the output of the AND gate 5 and to a first input of two AND gates 63 and 64, respectively. The reset input (PS) is connected to the output of the AND gate 63 while the outputs (QI) of the counter are connected to the four inputs of a NOR gate 61, the output of which is connected to a second input of the OR gate 62 and to a second input of the AND gate 64. The output of AND gate 64 is applied to the second input of the OR gate 7.

The operation of the circuit of FIG. 2 differs from that of FIG. 1 insofar as concerns the integers 60 to 65 which replace the gate 6. In the embodiment of FIG. 1, an output signal at the gate 5 coinciding with a high level at the point $Q_1$ would immediately reset the counter 1. However, to avoid a spuriously generated signal at the output of gate 5 having this effect, in the embodiment of FIG. 2, it takes a phase error detected in sixteen consecutive cycles to reset the counter 1. So long as $Q_1$ is low, a "1" is present at all the inputs of the counter 60 and this remains set to its maximum count. When the output at $Q_1$ goes high, the action of the inverter 65 is to apply a "0" to the inputs and consequently the counter 60 counts down with each input pulse from the AND gate 5 to its clock input (CP). When the counter has counted down sixteen consecutive pulses from the gate 5 indicating a phase error, the output count is zero and the NOR gate 61 produces a "1" output signal which acts on the gate 64 to reset the counter 1 and also to reset the counter 60 by way of the OR gate 62 and the AND gate 63.

The advantages of the present invention will be clear from the preceding description and in particular it will be noted that the invention provides circuits that are unaffected by random noise in addition to the normal sync pules or by the temporary omission of a sync pulse. The phase of the field frequency signal is very stable and well defined so that there is no vertical oscillation or trembling of the picture on the screen.

Phase is closely associated with the double-line-frequency clock so that interlacing of the two fields is perfect with consequent improvement in definition.

Performance in the presence of disturbance is even better on the FIG. 2 circuit in cases where there are disturbance and also missing synchronisms in that a delay is introduced by the circuit before synchronization is lost.

Many variations can be made:

For example, further selection can be made of the sync pulses (for example, on the basis of length using a shift register in the usual way) before they are sent to the inputs of flip-flops 2 and 3.

The 625 divider can be replaced by one with a different modulus in the case of standards with a different number of lines per frame, or it may even be a variable-modulus type in the case of multistandard receivers. OR gate 7 can be eliminated and the output picked up directly on terminal U of the divider in cases where temporary overscanning has no important effect on the operation of the vertical deflection stages. Counter 60 may be the up-down type designed for counting up and down depending on whether or not the output of counter 1 synchronisms coincide so as to get a proper average, etc.

I claim:

1. A circuit arrangement for vertical synchronization of a television receiver with respect to received sync signals, the arrangement comprising a frequency divider connected to receive pulses derived from an incoming line frequency signal to generate vertical sync pulses, a circuit for detecting coincidence between the vertical sync pulses generated by the divider and received vertical sync pulses included in a synchronization signal, which may include additional spurious pulses, a further circuit operative to forward only one pulse among the pulses included in said synchronization signal during each vertical deflection cycle said pulse being sent to a control circuit connected both to the coincidence detecting circuit and to the said further circuit, said control circuit producing a pulse indicative of any phase error between the generated and the received vertical sync pulses for resetting the divider to rephase the generated vertical sync pulses for synchronism with the received vertical sync pulses.

2. A circuit arrangement as claimed in claim 1, wherein the said further circuit includes means for recording the occurrence of the first received sync pulse occurring after a generated vertical sync pulse.

3. A circuit arrangement as claimed in claim 1, wherein the said further circuit comprises a set-reset flip-flop connected to receive the generated sync pulses and the received sync pulses.

4. A circuit arrangement as claimed in claim 1, in which the frequency divider comprises a resettable divider operative to divide a signal of double line frequency by a predetermined number.

5. A circuit arrangement as claimed in claim 1, wherein the said circuit for detecting coincidence is operative to sample the received sync pulses under the control of the generated sync pulses.

6. A circuit arrangement as claimed in claim 1, wherein the circuit for detecting coincidence comprises a flip-flop.

7. A circuit arrangement as claimed in claim 1, wherein the control circuit comprises an AND gate connected to the output of the circuit for detecting coincidence and to the output of the said further circuit and having an output connected to the reset input of the divider.

8. A circuit arrangement as claimed in claim 1, wherein the control circuit is connected to the circuit for detecting coincidence and to the further circuit and includes a counter which is operative to reset the divider after a predetermined number of received sync pulses are determined to be out of phase with the generated sync pulses.

9. A circuit arrangement as claimed in claim 1, wherein the output signal of the circuit arrangement is derived from the output of the frequency divider by way of an OR gate which is further connected to receive the reset signals applied to the frequency divider by the said control circuit.

10. A circuit arrangement for vertical synchronization of a television receiver with respect to received sync signals, the arrangement comprising a frequency divider connected to receive pulses derived from an incoming line frequency signal to generate vertical sync pulses, a circuit for detecting coincidence between the vertical sync pulses generated by the divider and received vertical sync pulses, a further circuit operative to produce no more than one pulse during each vertical deflection cycle indicative of any phase error between the generated and the received vertical sync pulses and a control circuit connected to the coincidence detecting circuit and to the said further circuit for resetting the divider to rephase the generated vertical sync pulses for synchronism with the received vertical sync pulses; wherein the control circuit is connected to the circuit for detecting coincidence and to the further circuit and includes a counter which is operative to reset the divider after a predetermined number of received sync pulses are determined to be out of phase with the generated sync pulses; wherein the said counter is operative to count down from a predetermined count each out of phase received sync pulse following a generated sync pulse and to be reset automatically when coincidence between the generated and the received sync pulses is detected, the counter being arranged to provide a resetting signal to the divider when a predetermined minimum count is reached.

11. A circuit arrangement for vertical synchronization of a television receiver with respect to received sync signals, the arrangement comprising a frequency divider connected to receive pulses derived from an incoming line frequency signal to generate vertical sync pulses, a circuit for detecting coincidence between the vertical sync pulses generated by the divider and received vertical sync pulses, a further circuit operative to produce no more than one pulse during each vertical deflection cycle indicative of any phase error between the generated and the received vertical sync pulses and a control circuit connected to the coincidence detecting circuit and to the said further circuit for resetting the divider to rephase the generated vertical sync pulses for synchronism with the received vertical sync pulses; wherein the said further circuit comprises a set-reset flip-flop connected to receive the generated sync pulses and the received sync pulses; wherein a delay circuit and an AND gate are connected in series with one another to the output of the set-reset flip-flop.

* * * * *